W. STRAIT.
TRACTION ENGINE.
APPLICATION FILED SEPT. 20, 1912.
1,130,117.
Patented Mar. 2, 1915.
4 SHEETS—SHEET 1.
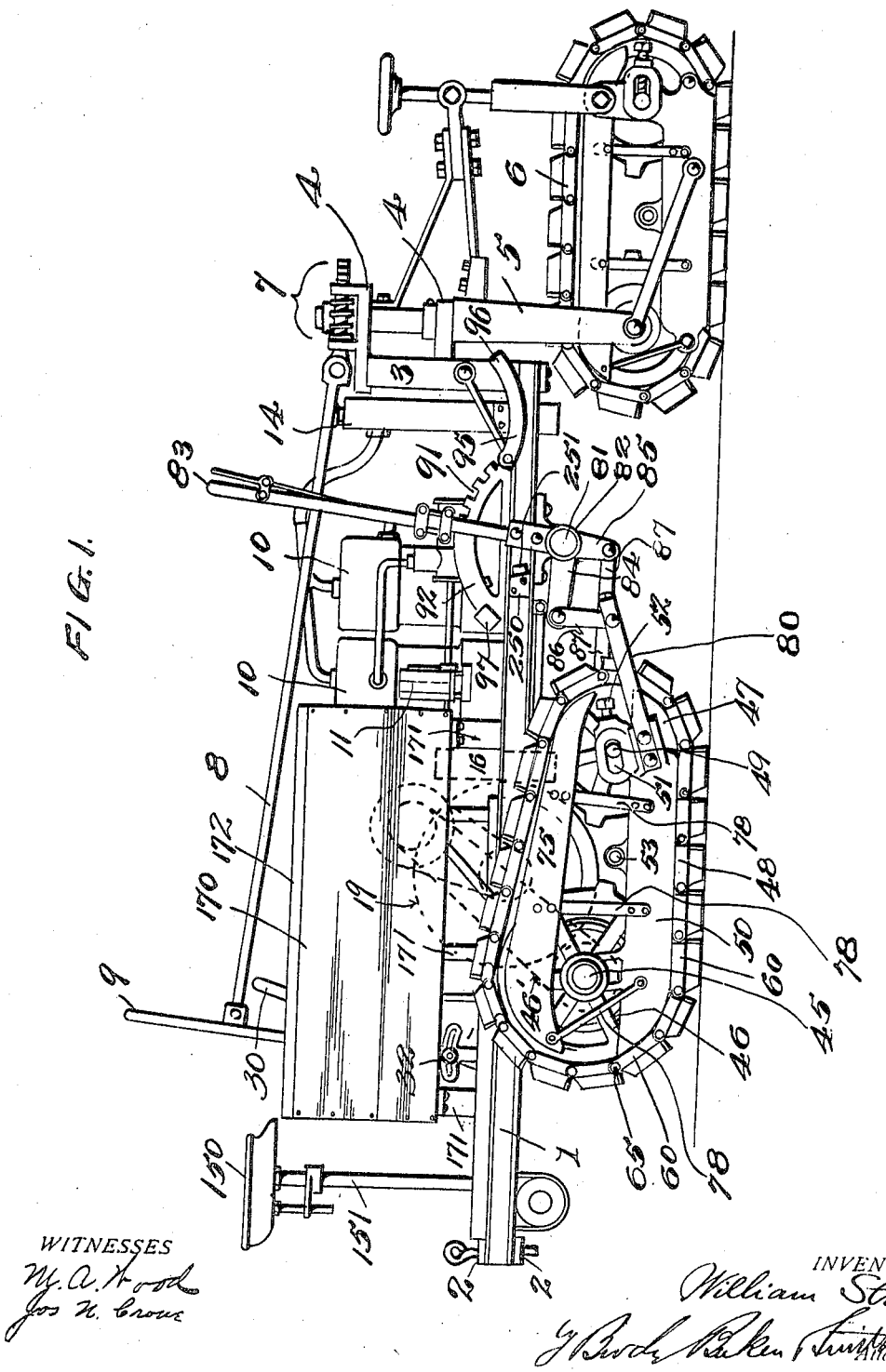
WITNESSES
INVENTOR
William Strait,
Attorneys W. STRAIT.
TRACTION ENGINE.
APPLICATION FILED SEPT. 20, 1912.
1,130,117.
Patented Mar. 2, 1915.
4 SHEETS—SHEET 2.
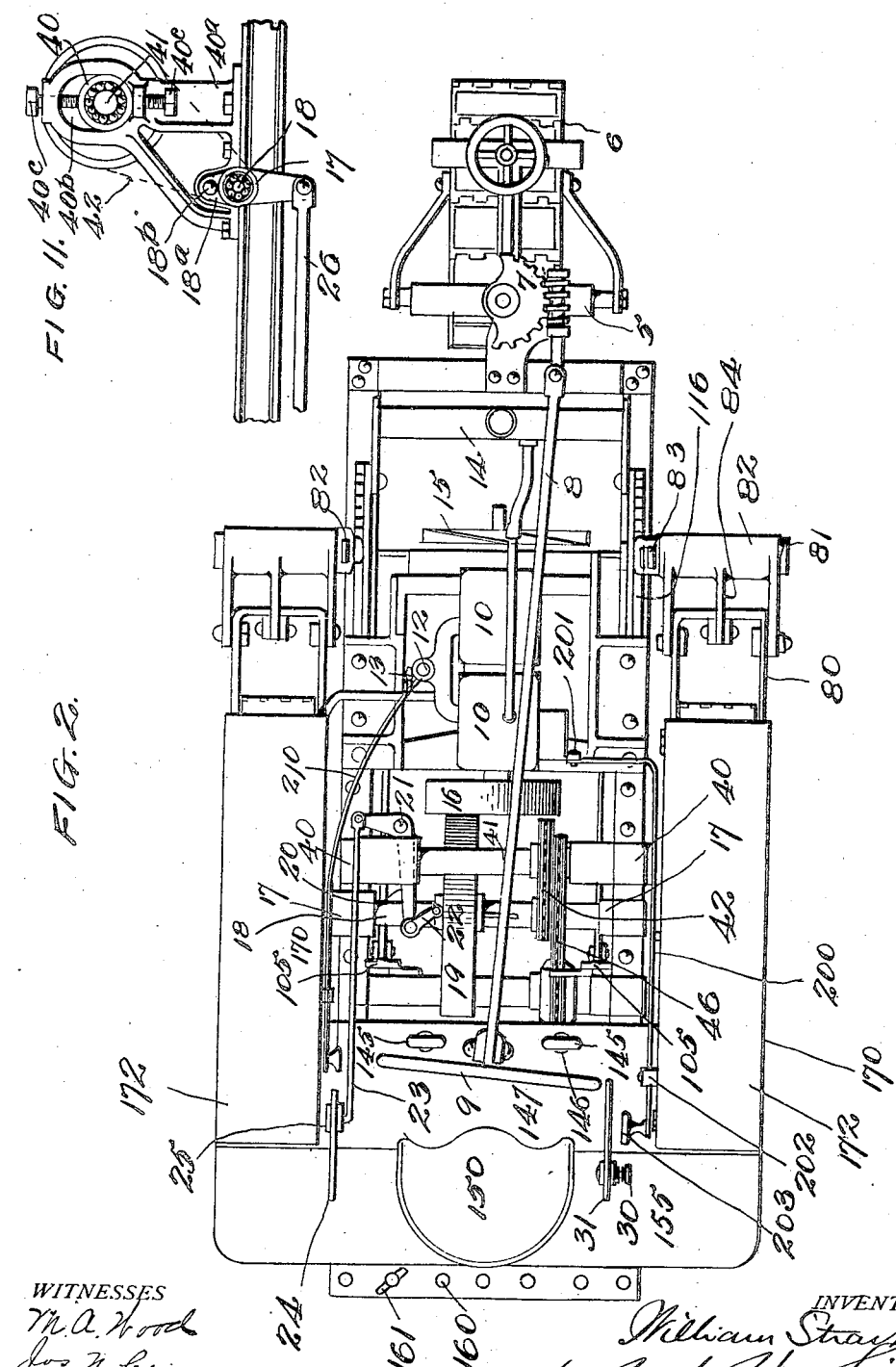
WITNESSES
INVENTOR
William Strait
Attorneys

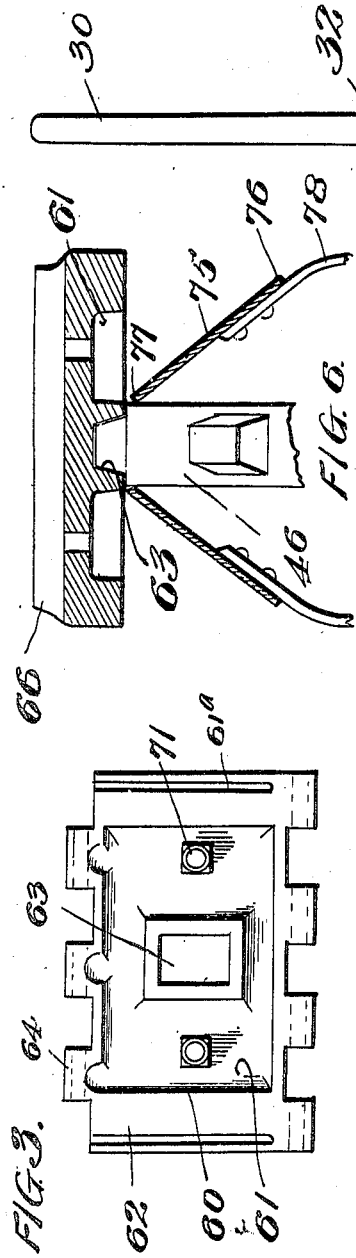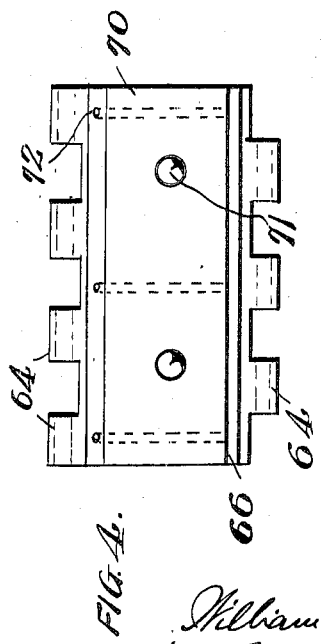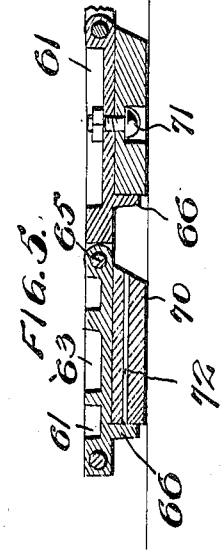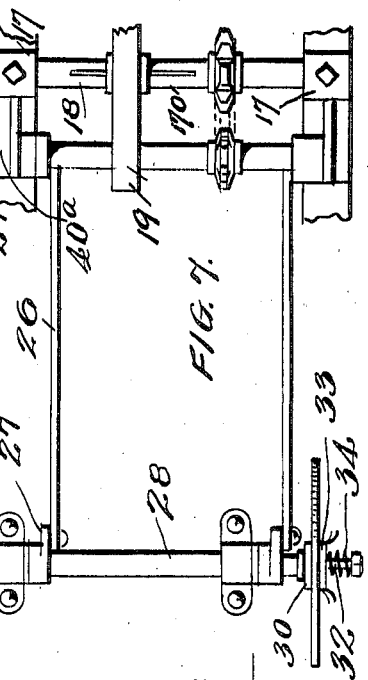

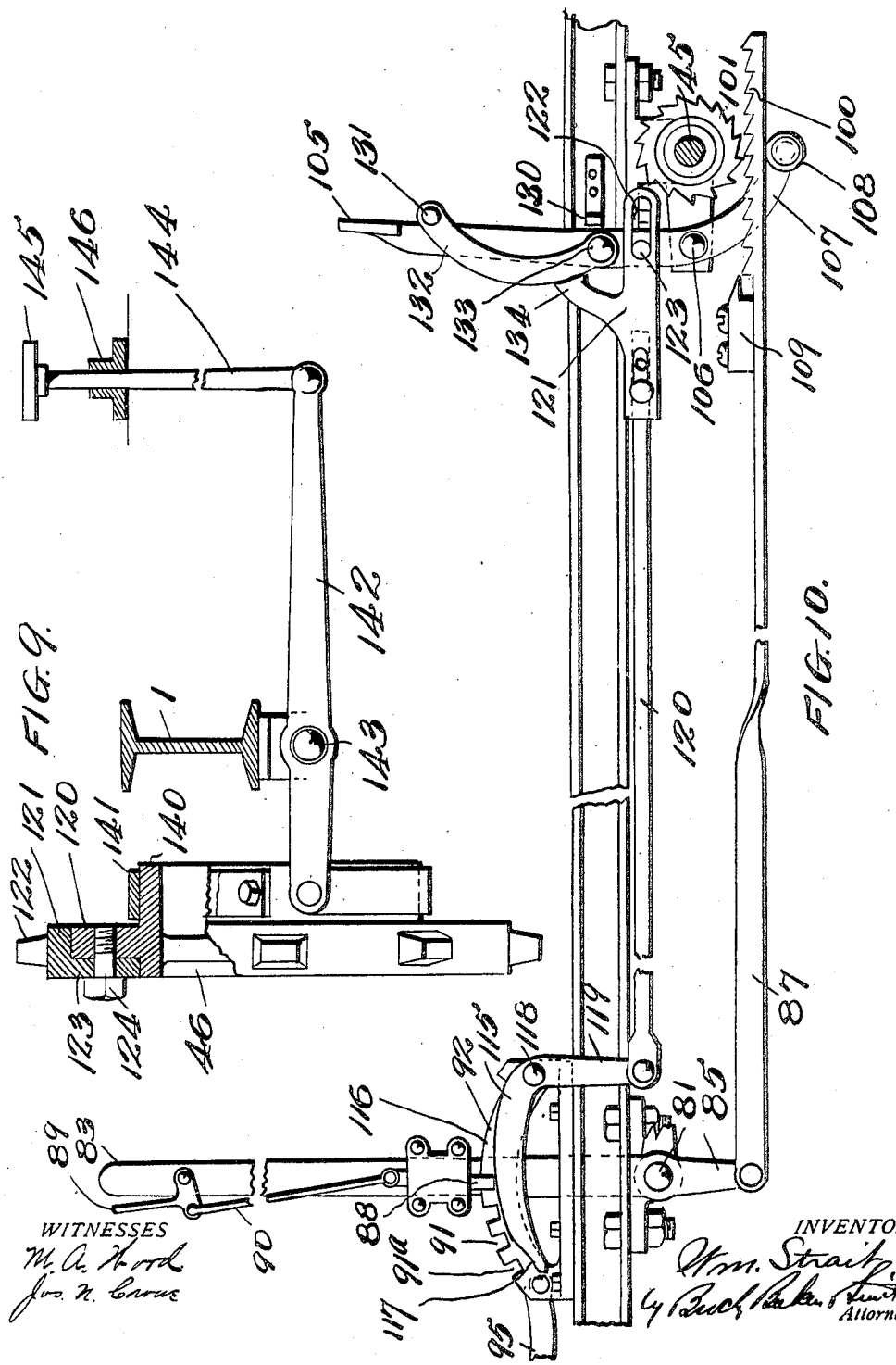

UNITED STATES PATENT OFFICE.

WILLIAM STRAIT, OF APPLETON, WISCONSIN.

TRACTION-ENGINE.

1,130,117. Specification of Letters Patent. Patented Mar. 2, 1915.

Application filed September 20, 1912. Serial No. 721,507.

*To all whom it may concern:*

Be it known that I, WILLIAM STRAIT, a citizen of the United States, residing at Appleton, Wisconsin, have invented a new and useful Improvement in Traction-Engines, of which the following is a specification.

My invention relates to a tractor designed especially for agricultural purposes, although it is available for a wide range of uses.

Among the principal objects of the invention are to provide a new and improved general arrangement of frame, motor, transmission or driving mechanism, controlling mechanism, and steering and driving tractor belts.

A further object is to provide brakes to coöperate with the driving tractors.

Another object is to provide a new and improved link for the tractor belts and dirt guards for the same.

A further object is to provide improved controlling devices for the raising and lowering of the free ends of the tractor belts.

Further objects are to provide an improved sprocket for the tractor belts and cushion bumpers for the belt-elevating mechanism.

The characteristics and advantages of the invention will be further described hereinafter as far as is necessary in connection with a detailed description of the accompanying drawing which shows one exemplifying embodiment of the invention. It is to be understood, however, that the invention is capable of embodiment in different forms.

In the drawings: Figure 1 is a side elevation; Fig. 2 is a plan; Fig. 3 is a top plan of one of the tractor links; Fig. 4 is a bottom plan of the same; Fig. 5 is a transverse section of the same; Fig. 6 is a transverse sectional detail of the tractor-chain and guards; Fig. 7 is a detail in plan of part of the transmission mechanism; Fig. 8 is a detail in elevation of part of the transmission mechanism; Fig. 9 is a transverse sectional detail of the brake mechanism, and Fig. 10 is a longitudinal elevation of the tractor-elevating controlling mechanism. Fig. 11 is a detail of the transmission mechanism.

Reference character 1 designates side frame members connected at the rear by bars 2 and at the front by an upwardly-arched member 3. This member carries forward extensions 4 in which a steering fork 5 is pivoted, and this fork carries the steering tractor 6. A suitable worm and gear mechanism 7, steering rod 8 and hand-wheel 9 at the rear, are provided for steering. The steering mechanism does not especially form a part of the present invention and will not be further described except so far as certain features of the steering structure are in common with the driving tractors.

The word tractor as used hereafter will apply to one of the tractor belts, with its related parts, and the machine as a whole will be described simply as the machine, or in some other language to distinguish from the tractor devices proper.

Forwardly located in the frame and supported by the side members 1 thereof, is the motor 10 having a suitable ignition device such as a magneto 11 and carbureter 12 provided with a throttle arm 13. Forward of the motor is a radiator 14 supported by the side frame members, and between the motor and the radiator is a fan 15, which may be mounted on the motor main shaft or an auxiliary shaft and driven by the motor. At the rear of the motor is fly-wheel 16, which is utilized as the driving disk of the friction power transmission gearing. Rearward of the motor and transversely mounted in suitable bearings 17 is the primary transmission shaft 18, on which the driven disk 19 is splined to travel across the face of the driving disk 16. The disk 19 is slid along its shaft to change the driving ratio by means of a bell-crank 20 pivoted at 21. One arm of the bell-crank is connected by a link 22 and collar with the driven disk, while the other arm of the bell-crank is connected by a link 23 with controlling lever 24 at the rear, convenient to the operator. This lever has a friction pivot 25 for holding it in adjusted position, as will be hereinafter described. Starting and stopping of the tractor is accomplished by engaging and disengaging the driven disk 19 with the driver 16. This is done by making the bearings 17 slidable on the frame and connecting them by links 26 with arms 27 of the rock-shaft 28 extending across the machine near the rear. This shaft is provided with an upwardly extending lever 30 and the lever is secured in adjusted position by engagement with a slotted arc-shaped segment 31 fixed to the frame. A bolt 32 extends through the slot and the lever and a disk 33 is pressed against the face of the sector 31 by a spring 34 secured to the bolt by a nut 35. This provides a continuous frictional engagement between the lever and the segment, which is sufficient to hold the driven disk in engagement with its driver under ordinary conditions, but which does not hold it positively enough to cause injury to the mechanism in case of abnormal strains in driving, etc.

The pivoted mounting 25 of lever 24 above referred to, is similar to the construction just described in the respect that pivot 25 consists of a bolt, washer and spring, substantially the same as parts 32, 33, 34, 35 just described. Evidently, the spring and washer applied to mounting 25 make a frictional engagement with lever 24 and its mounting, and serve to conveniently hold the driven disk 19 in adjusted position on its shaft without the provision of any positive device, such as a ratchet.

The frame members 1 carry brackets 40 extending upwardly, and in bearings at the top of these brackets countershaft 41 is mounted. Sprockets and a chain 42 connect the primary transmission shaft 18 with the countershaft 41. Toward the rear and below the frame drive shaft 45 is mounted in suitable bearings. This shaft is connected with the countershaft by sprockets and a chain 46'. Suitable differential mechanism is provided (the details of which are not important), to transmit the driving effort to both ends of the axle and to permit one end to turn faster than the other in rounding curves.

On each end of the axle 45 is mounted a drive sprocket 46 and in front of each drive sprocket is an idler sprocket 47. A drive belt or chain 48 passes around each drive sprocket and its corresponding idler and this mechanism at each side of the machine is collectively described as one of the two tractors or tractor belts. In each tractor, the idler sprocket is carried on a shaft 49 and this is spaced away from the driving shaft by two radius members 50, one at each side of the tractor. The shaft 49 engages slots 51 in the radius members and is adjustable in these slots by means of screws 52 or other suitable devices so that the tension of the belt is easily adjusted. For this purpose the shaft may be mounted in blocks screw-threaded to receive the screws. Radius members 50 are spaced apart between the sprockets by cross-bars 53. In addition to spacing the sprockets apart the radius members 50 constitute casings for roller bearings which engage the inner faces of the belt and hold it firmly in contact with the ground between the two axles to give an ample driving grip upon the ground under all conditions. The details of this roller bearing are not a part of the present invention. It will be noticed, however, that by the provision of one of the radius members and its bearing at each side of the tractor belt and practically at the edge of the belt, the belt is firmly held down at both sides and is thus most positively kept in contact with the ground.

The tractor chains or belts are formed of links 60. The upper part of the inner face of each link is hollowed out or cut away as at 61 (Figs. 3 and 5), leaving at each side tracks or rails 62 which are engaged by the rollers carried in housings 50. At the center, each link is provided with a socket 63 to fit the sprocket teeth. Each link is also provided with hinge members 64 to fit between similar members on the adjoining link, the hinges being completed by pins 65 passing through members 64. On the outer face the upper area of each link is flat but near the front or rear transverse edge there is provided a flange or blade 66 which bites into the ground and gives very positive traction when no attachments are used on the belts. But in cases where the blades 66 might injure the road surface, or where for any reason it is desired to do so, blocks 70 of suitable material (conveniently wood) are secured to the outer faces of the links by any convenient means, such as bolts 71. These blocks are reinforced by rods or pins 72, several of these rods usually being provided in each block running across the grain. These prevent splitting of the blocks during a long period of service. The countersinks or hollowed spaces 61 in the links serve to receive dirt which gets about the inner face of the belt and might otherwise come in contact with the sprockets or roller bearings. Devices are provided to coöperate with these recesses and throw the dirt away from the belts. These consist of inclined shields 75 supported below the upper part of each belt and extending fore and aft of shafts 49 and 45, respectively. The lower edges 76 of the shields extend out beyond the belts so that dirt dropping upon the shields from the recesses 61 is thrown out clear of the belts. The inner edges 77 of the shields are close against the sprockets and prevent dirt dropping upon the axle bearings or the belt roller bearings. The shields are supported by arms 78 extending upward from casings 50.

The free end of each tractor is elevated or depressed by the following mechanism: The forward extension of each tractor frame is provided with bars 80 connected to radius members or housings 50. Forward of each tractor, each frame member 1 carries a stud-shaft 81 and on this is journaled a sleeve 82. Upward from the sleeve extends a lever 83; laterally extend arms 84, and downwardly extends an arm 85. Arms 84 are connected by links 86 with the extensions 80 of the tractors while each arm 85 is pivotally connected to a link 87 leading to the rear. Each elevating lever 83 is provided with a pawl 88 and a suitable finger-piece 89 and link 90 for operating the pawl by hand. The pawl engages notches 91 cut in the arc-shaped segment 92 fixed to the frame. Evidently, when the lever 83 is pulled forward and pawl 88 allowed to engage with one of the notches 91, the front end of the tractor belt is elevated and held up for turning purposes or other reasons. The notches 91 may be extended to the rear of the segments as far as desired and evidently when lever 83 is pushed to the rear and the pawl engaged with a suitable notch, the free end of the tractor is positively held down in engagement with the ground to give increased traction under certain circumstances. Pawl 88 may be thrown out of action entirely, to permit the free ends of the tractors to ride at will over uneven ground by moving the levers 83 to the rear and throwing over the guards 95, one of which is pivoted to each of the segments at the front. These guards are arc-shaped and when thrown over their ends 96 rest against blocks 97 at the rear of the segments. The guards then form a smooth upper contour adjacent to each segment upon which the corresponding pawl 88 rides and is thus prevented from engaging notches 91. But it is usually desired to utilize the driving mechanism of the machine for elevating the tractors, and to control the lifting and dropping of the tractors from the driver's seat, and this is most conveniently effected by means of pedals. For this purpose, links 87 are provided at their rear ends with racks 100 and these racks lie under pinions 101 secured to the axle 45 near each drive sprocket 46. The racks and pinions may be of ratchet type, as shown, so that they will not operate when the machine is driven backward, or they may have ordinary rack and gear teeth if it is desired. As the machine is driven forward, it will be evident that when either rack is brought into engagement with its pinion 101 the rack will be pulled to the rear by the rotation of the adjacent end of the axle 45; arm 85 on the corresponding lever sleeve 82 will be raised and the front of the corresponding tractor thus elevated. To effect engagement of the rack with their pinions pedals 105 are provided adjacent to the operator's seat. These pedals are pivoted at 106 to the frame member and have downwardly extending arms 107 carrying rollers 108 engaging under the racks. Evidently, when either pedal is moved forward its roller 108 is raised, throwing the rack into engagement with the pinion. To insure disengagement of the rack from the pinion at the proper time, so that the tractor will not be elevated too far, the rack may be provided with an adjustable stop or throw-off block 109. Other means for effecting disengagement of the rack from the pinion may be provided. The foot-controlling mechanism is usually employed when guards 95 are in idle position, as shown in Fig. 1, and then the pawls 88 of levers 83 are, therefore, free to engage the segments 92. The pawls must be disengaged from the segment notches before the power-mechanism is used to elevate the tractors, otherwise breakage would result. For this purpose, each segment 92 is provided with a tripping sector 115. This has an arc-shaped face 116 lying under the corresponding pawl 88. This face terminates in a cut away releasing member 117 opposite the last notch of the segment. The tripping sector 115 is pivoted at 118 to segment 92 and has a depending arm 119 to which is connected a link 120 running to the rear. This link terminates in a fitting 121 having at its rear end a slot 122 in which engages a pin 123 carried by pedal lever 105. Now, when pedal 105 is pushed forward to engage rack 100 with pinions 101, pin 123 engaging with the front end of slot 122 pushes forward link 120 and raises the tripping sector 115. This sector throws pawl 88 out of engagement with any notch 91 of segment 92 that the pawl happens to be in and permits lever 83 to move freely forward as the tractor is elevated. As the tractor approaches its highest position, pawl 88 comes to the cut-away releasing member 117 or sector 115 and slides down into the last notch 91$^a$. Sector 115 cannot be raised high enough by pedal 105 to throw pawl 88 out of the notch 91$^a$ because the forward movement of pedal 105 is checked by engagement of rack 100 with its pinion at the moment when the upper face of the throw-off member 117 is substantially level with the bottom of notch 91$^a$. In its rearward position pedal lever 105 rests against a stop 130 on the frame. To release pawl 88 from notch 91$^a$ and permit the structure to drop to the ground, a pedal 131 is provided. This pedal is carried by a pedal lever 132 pivoted to pedal lever 105 at 133. The edge of lever 132 rests against an upwardly-projecting arm 134 of the link fitting 121. At any time when pawl 88 is in notch 91$^a$, pedal 131 may be moved forward, thus moving link 120 and raising trip sector 115, so that throw-off 117 rises to the top of notch 91$^a$ and thrusts pawl 88 out of the notch, permitting the lever to come back freely as the structure drops by gravity to its lowest position.

To facilitate turning, as will be hereinafter explained, each drive sprocket 46 is provided with a brake drum 140. Coöperating with each drum is a brake band 141 connected at one end to the frame. The free end of each brake band is connected to one end of a brake lever 142 pivoted at 143 to the frame. The other end of each brake lever is connected to the pedal rod 144, carrying a brake pedal 145 at its upper end. The rod 144 is guided by an eye or thimble 146 secured to foot-board 147.

For the driver a form seat 150 is provided at the rear. This may have a spring mounting in column 151. Flooring at the rear is provided consisting of foot-board 147 above mentioned and board 155 extending across the rear upon the frame. For the convenient attachment of different farm implements or vehicles, the rear cross-frame members 2 may constitute a draw-bar. This is accomplished by providing them with a plurality of holes 160 in which one or more pins 161 may be placed to readily engage a link or a chain connected with the load and which may be placed between the bars.

To provide guards over the tractor belts and to conveniently house accessories, boxes 170 are provided, one at each side of the machine toward the rear. These are supported over the tractor belts by brackets 171 rising from the frame and extending outward under the boxes. The boxes are provided with hinged lids 172. The inner sides of these boxes may be conveniently utilized for the support of engine controlling devices. For instance, as shown in Fig. 1, long "spark" lever 200 is pivoted on the inner side of the right hand box. One end of this is bent inward and connected by a link 201 to a movable part of the magneto to regulate the spark position, while the other end of the lever moves from a sector 202 and is provided with a notch 203 convenient to the operator. At the other side a similar controlling lever 210 is provided supported by the left hand box and connected to the throttle.

The sprockets employed in the tractor are subject to considerable wear and for this reason it is desired to provide for them removable rims. In Fig. 9 this feature is shown. The sprocket proper, 46, is provided with a circular flange 120, and the rim 121 which carries teeth 122 is made in any convenient number of pieces so that it can be removed without dismantling the machine. The rim may vary in cross-section, but is, as conveniently shown, of L-shape, in which the head rests on periphery of flange 120 and side member 123 rests against the side of the flange to which it is secured by set screws 124.

The operation of the transmission and engine controlling mechanism has been sufficiently explained. The operation of detailed parts of the tractor controlling mechanism has also been explained, but the general operation of the tractors in ordinary running of the machine will now be briefly mentioned.

In running over rough ground or where the pull is light, the free ends of the tractors may be left loose so that they rise and fall in accordance with the irregularities of the ground. Or if the pull is heavy or if the ground is soft, the front ends of the tractors may be positively held down by engaging pawls 88 with rearward notches 91 of segments 92. When it is desired to turn, to facilitate turning it is usually desirable to allow the free end of the tractor at the outside of the curve to remain down or to hold it positively down, while the free end of the tractor at the inside of the curve is raised so that the machine will pivot about the drive sprocket of the inside tractor as a center under the impulse furnished by the driving power applied to the other tractor, acting through the entire surface of the tractor belt in engagement with the ground. In this way a very powerful and positive turning effect can be obtained, which will turn the machine in a very small space even on unusually soft and slippery ground. To make the turn, therefore, the pedal 105 toward the inside of the turn is pushed forward, thus causing the driving mechanism to elevate the corresponding tractor. Turning may be facilitated by at the same time applying the brake at the same side of the machine. This may be done immediately after the tractor is elevated by depressing the corresponding pedal 145. This holds drive sprocket at the inside of the turn stationary and compels the entire driving power of the engine acting through the differential to be exerted on the outer tractor. When the turn is completed the brake is released and the tractor is permitted to drop by pushing forward pedal 131 which releases pawl 88 from notch 91$^a$, and thereupon the tractor drops under the influence of gravity. Of course, at any time both tractors may be elevated at once by pushing both pedals 105. This independent controlling of the elevation of the tractors by the power mechanism and the independent releasing mechanism is evidently of great importance. The brakes may, of course, be applied simultaneously to check or stop the machine on a grade. When pawls 88 are released from their notches to allow the tractors to drop, levers 83 move backward rapidly. To arrest the movement of the levers without injury to any of the mechanism blocks 250 are secured to the frame adjacent to the levers and these are provided with rubber or other suitable cushions 251 against which the levers strike when they reach their proper rearmost position. The blocks may be made adjustable if desired by means of a plurality of holes in the frame to receive their fastening screws, or by slots to receive fastening bolts or like means.

Fig. 11 shows certain features of the transmission mechanism. Bearings 40 for countershaft 41 may, in a preferred construction, be supported in a bracket 40ª. At its upper end this bracket has vertical slots 40ᵇ inclosing the bearings, and the bearings are vertically adjusted in these slots to regulate the chain tension by means of screws 40ᶜ. Bearing 17 for primary transmission shaft 18 may be carried at the ends of swinging arms 18ª pivoted at 18ᵇ to parts of brackets 40ª. Arms 18ª extend below the bearings, and links 26 for moving the primary shaft to engage and disengage the driven pulley are connected to these arms at their lower ends. By this arrangement the driving reaction acting through the chains always tends to swing shaft 18 toward the driving pulley 16 and to keep the pulleys in engagement. This feature is especially valuable when the tractor is pulling heavily, since no tension on the part of the operator is required to keep the driving members in engagement and the engaging pressure varies directly with the driving pull. This is practically an automatic clutch feature.

Chain links 60, as shown in Fig 3, are provided with channels 61ª on their inner faces close to the outer edges of the links. These channels run close to the edges of cover plates 50 of the roller bearings. Dirt getting on the chain drops into these grooves or channels instead of working in under the rollers and is carried up until the channels are in inverted position and then drops down and is thrown out by guard 75.

I claim:

1. In a traction machine, the combination of a main frame, steering means, a driving tractor belt at each side of the main frame, a motor, a drive shaft connected to said driving tractors and having differential mechanism connected with said motor for driving the tractors differentially in turning, and an independently acting brake and brake-operating means for each tractor.

2. In a traction machine, the combination of a main frame, steering means, a driving tractor belt at each side of the main frame, a motor, a drive shaft connected to said driving tractors and having differential mechanism connected with said motor for driving the tractors differentially in turning, an independently acting brake and brake-operating means for each tractor, independent means for raising and lowering and holding in adjusted position one end of each tractor belt.

3. In a traction machine, the combination of a main frame, steering means, a driving tractor belt at each side of the main frame, a motor, a drive shaft connected to said driving tractors and having differential mechanism connected with said motor for driving the tractors differentially in turning, an independently acting brake and brake-operating means for each tractor, independent means for raising and lowering and holding in adjusted position one end of each tractor belt, and means actuated by the driving mechanism of the vehicle for operating said belt raising and lowering means.

WILLIAM STRAIT.

Witnesses:
GEORGE T. RICHARD,
P. A. KORNELY.